April 26, 1927.
A. ST. JOHN
1,626,306
METHOD OF PRODUCING HOMOGENEOUS X-RAYS AND APPARATUS THEREFOR
Filed July 18, 1923
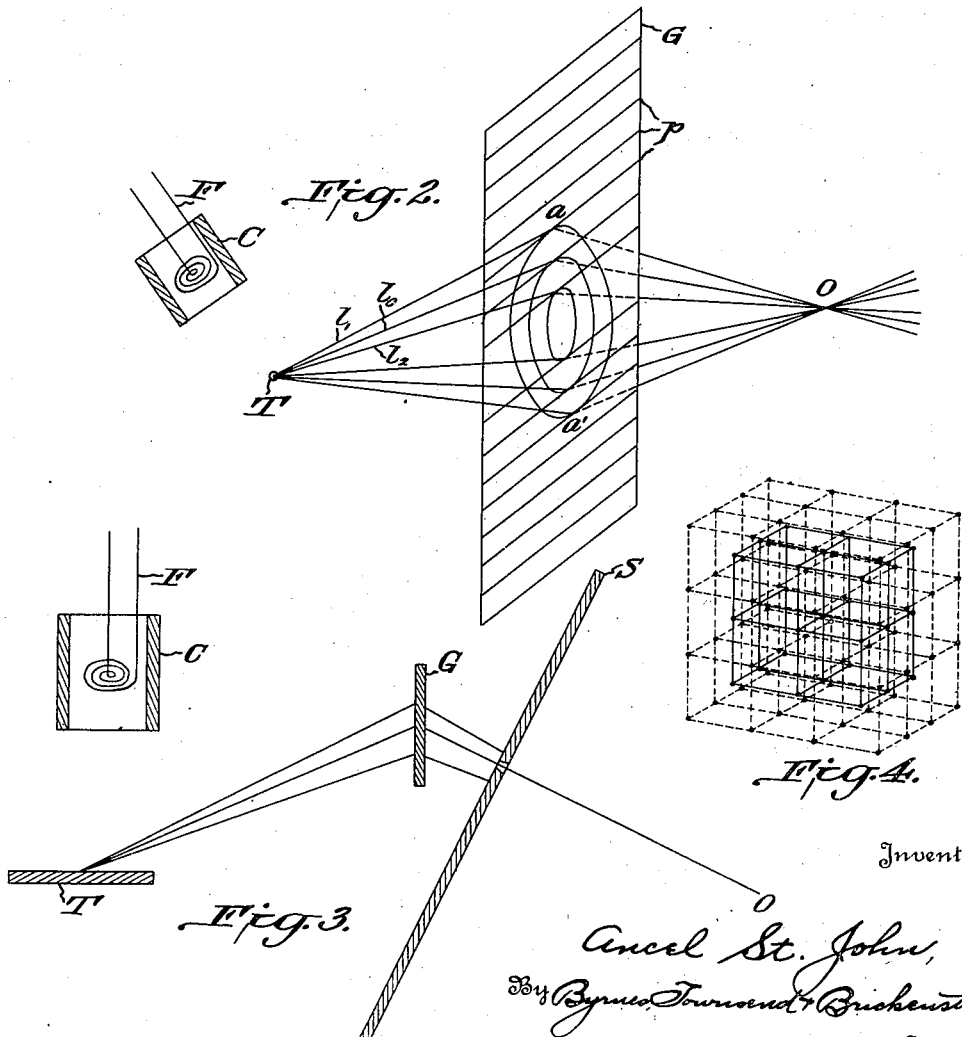
Inventor:
Ancel St. John,
By Byrnes, Townsend & Brickenstein,
Attorneys.

Patented Apr. 26, 1927.

1,626,306

UNITED STATES PATENT OFFICE.

ANCEL ST. JOHN, OF BROOKLYN, NEW YORK, ASSIGNOR TO UNION CARBIDE & CARBON RESEARCH LABORATORIES, INC., A CORPORATION OF NEW YORK.

METHOD OF PRODUCING HOMOGENEOUS X RAYS AND APPARATUS THEREFOR.

Application filed July 18, 1923. Serial No. 652,394.

The invention is a method and apparatus for producing substantially homogeneous X-rays, that is to say, X-rays in which the complete absence of all wave-lengths but one is more or less closely approximated. Because of their analogy to homogeneous light rays, such X-rays are often referred to as monochromatic.

Objects of the invention are to secure a greater intensity of the desired wave-length and a more complete exclusion of other wave-lengths than have heretofore been obtained. A further object is to provide a method which is generally applicable to radiations from the various chemical elements.

The X-rays produced in any given chemical element used as anticathode or target comprise a rather wide range of wave-lengths. However, if the element is suitably excited, there are conspicuous maxima of intensity in certain groups or series of wave-lengths, characteristic of the element emitting the radiation. That series which is of major intensity is called the K series, regardless of what element emits the rays, and the strongest line of this series is called the alpha line, being completely identified as the $K\alpha$ line of the element in question. The K series also contains beta and gamma lines of lesser intensity.

Prior proposals for the production of homogeneous X-rays have usually involved the use of filters, whereby the relative intensity of the $K\alpha$ line is enhanced. These filters do not absorb the wave-lengths to be suppressed as completely as is desirable; and they absorb the energy of the $K\alpha$ line to a serious extent. Furthermore, a good filter should be rich in an element having an atomic number which bears a definite relation to that of the element emitting the radiation, and since a wide variety of elements may be used for targets, an appropriate filtering material is not always available.

In accordance with my invention, X-rays are subjected to diffraction, and the body on which the rays are to be caused to act is disposed at a point which is reached only by rays of homogeneous wave-length. The diffraction is brought about by a material rich in the element which emits the rays, and, by a resonance effect, the intensity of the wave-length to be isolated is largely increased.

All attempts to produce diffraction of X-rays with artificial gratings have failed, and it was not possible to study the diffraction of the rays experimentally until it was discovered that crystalline substances are adapted by the regularity of arrangement of their planes of atoms, and by the distance between adjacent planes, to act as diffraction gratings for X-rays. The inter-plane distance, or lattice constant of a crystal is of course incomparably smaller than the distance between the adjacent lines in any artificial grating, a necessary condition for the diffraction of such short waves as those in which X-rays travel.

When X-rays are diffracted, the intensity of the diffracted beam is very low except when the angle of incidence is such that minimum deviation of the beam is produced. In that case, an intense diffracted beam is obtained. With minimum deviation, the following equation applies to the diffracted beam of the $n$th order:

$$nl = 2d \sin \frac{\theta}{2}$$

where $l$ is the wave-length, $d$ the distance beween adjacent planes of atoms, and $\theta$ the angle of deviation.

In the accompanying drawing,

Fig. 1 comprises two curves, one showing the energy distribution on the various wave-lengths in the molybdenum X-radiation, and the other being a corresponding curve for the radiation after filtering through a zirconium compound;

Fig. 2 is a diagram illustrating in perspective an embodiment of my invention;

Fig. 3 is a modification in which certain refinements are introduced; and

Fig. 4 shows a hypothetical arrangement of the atoms in the member G of Figs. 2 and 3.

In Fig. 2, I have shown a source of X-rays T, represented as a target bombarded by electrons from the incandescent cathode F, the electrons being directed by the focusing tube C. G is a sheet of crystalline material, preferably so cut or otherwise produced that a large number of atom planes are normal to the surface of the sheet (see Fig. 4).

X-rays from T will reach all points of one surface of member G. If the X-rays are assumed to emanate from a point source, it will be seen that the locus of points on G where rays of wave-length $l_0$ strike G at the proper angle to give minimum deviation of the first-order beam is a circle. Neglecting all atom planes in G except the set to be utilized, there will be only two points, $a$ and $a'$, on this circle where the planes are properly arranged to give diffraction, viz the points where the circle referred to is tangent to the lines of intersection $p$ of the atom planes and the surface of G. From these points, strong beams will be diffracted to O which is in the normal to G through T, O and T being equi-distant from G. Longer waves, of length $l_1$ will be similarly diffracted to O but by other paths, and waves of length $l_2$, less than $l_0$ will be also diffracted to point O. The resolution of the radiation is thus illustrated. In general, in any plane back of G, there will be two points where homogeneous rays of a given wave-length are present, and the K$a$ line will appear with much intensity.

By using a broad focal spot as in Fig. 3, a similar diffraction of the desired wave-length is also obtained at points on either side of $a$ and $a'$ on the tangents $p$ through these points, and the region at O reached by homogeneous waves will be enlarged. By using only one of the points $a$, $a'$, the size of member G can be greatly reduced.

A screen S, opaque to X-rays and having a suitable aperture, for example a slit, may be placed back of G in such position that no rays except those of the desired wave-length with reach the region back of the screen.

An important feature of my invention is the use in the member G of a crystalline material rich in the atom of which the source T is composed. A resonance effect is thereby produced, by which the intensity of the radiation isolated is considerably augmented. The member G may be composed of a crystalline compound of the metal emitting the radiation. For example, with a molybdenum target, molybdenite; a crystalline sulphid of molybdenum, may be used. It will frequently be possible to use a sheet of the metal itself as the member G, and it is by no means necessary that G be a single crystal, whether elementary or a compound in nature.

A metal sheet having an oriented crystalline structure can frequently be produced by cold-rolling. This method is especially applicable where the metal has a cubic body-centered structure as in that case a large proportion of the atom planes which are normal to the crystal axes will be arranged normal to the surface of the sheet as the crystal axes are oriented in the direction of rolling. A sheet of cold-rolled molybdenum 0.2 mm. in thickness has been used with excellent results.

Sections split or otherwise formed from single crystals are ideal for use in connection with my invention. It will be observed that a very small section will be sufficient. A wide variety of oriented crystalline substances, including substances in powdered form, may be used with good results.

A principal advantage of the invention arises from the fact that the best element for the member G is the element of which the target is constructed. Since targets are made from readily procurable materials, a material for diffracting the rays is never lacking.

The invention may be embodied in many different forms of apparatus. One or more of the parts G, S, and O may be within the X-ray tube, or all may be outside. In some instances, the screen S may be dispensed with, or additional screens may be used to secure particular effects. My invention is not limited, except by the appended claims.

I claim:

1. Method of producing substantially homogeneous X-rays which comprises dispersing a beam of X-rays by diffraction in a material rich in the atom from which the rays are emitted; and selectively screening the divergent rays to absorb undesired wavelengths.

2. Method of producing substantially homogeneous X-rays which comprises receiving a beam of X-rays obliquely on a thin cold-rolled sheet of the metal emitting the rays, the angle of incidence being such that the desired wavelength is diffracted with minimum deviation by atom planes normal to the surface of the sheet, and intercepting the undesired wavelengths emerging from said sheet by a screen which does not intersect the path of the rays of the desired wavelength.

3. Method of producing substantially homogeneous X-rays which comprises emitting and dispersing X-rays by different portions of a single metal, the dispersing portion containing crystals oriented to diffract the desired wave-length with minimum deviation; the selectively screening the divergent rays to absorb undesired wavelengths.

4. Apparatus for producing substantially homogeneous X-rays which comprises a source of X-rays; a crystalline substance rich in the atom which predominates in said source, said crystalline substance being arranged to disperse rays from said source by diffraction in such manner that regions traversed by homogeneous rays will be formed; and a screen intersecting the paths of undesired wavelengths.

In testimony whereof, I affix my signature.

ANCEL ST. JOHN.